(12) United States Patent
Coelho

(10) Patent No.: US 7,873,376 B2
(45) Date of Patent: *Jan. 18, 2011

(54) METHOD AND SYSTEM FOR TRANSMITTING AND RECEIVING SMS MESSAGES WITH REMAPPED RESPONSE CODES

(75) Inventor: David R. Coelho, Los Altos Hills, CA (US)

(73) Assignee: iTechTool Incorporated, Los Altos Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/707,983

(22) Filed: Feb. 18, 2010

(65) Prior Publication Data

US 2010/0151891 A1    Jun. 17, 2010

Related U.S. Application Data

(62) Division of application No. 11/463,521, filed on Aug. 9, 2006, now Pat. No. 7,676,235.

(51) Int. Cl.
*H04W 40/00* (2009.01)
*H04M 11/00* (2006.01)
*H04B 1/38* (2006.01)
*G06F 15/16* (2006.01)

(52) U.S. Cl. ............... 455/466; 455/406; 455/566; 709/206; 709/207

(58) Field of Classification Search ............... 455/466, 455/406, 566; 709/206, 207
See application file for complete search history.

(56) References Cited

U.S. PATENT DOCUMENTS 5,630,207 A    5/1997    Gitlin et al.
5,915,001 A    6/1999    Uppaluru
6,002,918 A    12/1999   Heiman et al.
6,014,429 A    1/2000    LaPorta et al.
6,463,462 B1   10/2002   Smith et al.

(Continued)

FOREIGN PATENT DOCUMENTS

EP    0999685    5/2000

OTHER PUBLICATIONS

Search Report for European Patent Application No. 07252859.9, published on Nov. 30, 2007.

(Continued)

*Primary Examiner*—Huy Phan
*Assistant Examiner*—Kuo Woo
(74) *Attorney, Agent, or Firm*—Radlo & Su LLP

(57) ABSTRACT

A method and system are disclosed in which a Mobile Terminated SMS (Short Message Service) wireless message generated by a Computer Application containing an embedded response menu can be sent to a Mobile Handset and in which a Mobile Originated response from the Mobile Handset can be uniquely re-associated with the original Mobile Terminated message is described. Given that SMS provides no inherent association between Mobile Terminated and Mobile Originated messages, the method and system provide a scheme in which the original Computer Application menu response options are remapped to unique values prior to delivery to the Mobile Handset. When the response is received from the Mobile Handset, the method can uniquely re-associate and reverse map the response code back to the original Mobile Terminated message and original menu response options.

28 Claims, 6 Drawing Sheets

U.S. PATENT DOCUMENTS

| | | |
|---|---|---|
| 7,058,036 B1 | 6/2006 | Yu et al. |
| 2002/0112014 A1 | 8/2002 | Bennett et al. |
| 2002/0187794 A1 | 12/2002 | Fostick et al. |
| 2003/0211856 A1 | 11/2003 | Zilliacus |
| 2004/0006601 A1 | 1/2004 | Bernstein et al. |
| 2005/0114533 A1 | 5/2005 | Hullfish et al. |
| 2005/0176451 A1 | 8/2005 | Helferich |
| 2005/0188090 A1 | 8/2005 | Washburn |
| 2006/0047568 A1 | 3/2006 | Eisenberg et al. |

OTHER PUBLICATIONS

Chinese Office Action mailed on Dec. 11, 2009 for Chinese Patent Application No. 200710140278.9.

690
Delete all entries from Response Lookup Database which are older than KEEPTIME seconds

METHOD AND SYSTEM FOR TRANSMITTING AND RECEIVING SMS MESSAGES WITH REMAPPED RESPONSE CODES

CROSS REFERENCE TO RELATED APPLICATIONS

This application is a divisional of U.S. patent application Ser. No. 11/463,521, which was originally filed on Aug. 9, 2006, now issued as U.S. Pat. No. 7,676,235, the disclosure of which is incorporated by reference herein in its entirety.

COPYRIGHT NOTICE

A portion of the disclosure of this patent document contains material that is subject to copyright protection. The copyright owner has no objection to the reproduction of the patent document or the patent disclosure in exactly the form it appears in the Patent and Trademark Office patent file or records, but otherwise reserves all copyright rights whatsoever.

BACKGROUND OF THE INVENTION

1. Field of the Invention

The present invention relates generally to wireless communications and more particularly to short message service between various types of computing devices and mobile handsets.

2. Description of Related Art

Short Message Service (SMS) is implemented by wireless carriers to allow text messages to be sent to and from cellular phones within a predefined geographic region or across international boundaries. SMS messages generally have the following characteristics: recipient phone number, text message and sender number. The recipient phone number is typically a number which adheres to international dialing plan features, namely a country code plus country specific number. The sender number can have one of two forms: a full international dialing plan number, or a short code. Short codes are usually unique only within a given geographic region such as a country and typically are 4, 5, 6 or more digits in length.

For mobile-to-mobile SMS (messages from one cellular phone to another cellular phone), the sender number is the international dialing plan number of the sending cellular phone. For computer application-to-mobile SMS, the sender number can be either an international dialing plan number or a short code. For computer applications, it is desirable to be able to send an SMS message (mobile terminated message) to a cellular phone, and have the recipient provide a responding SMS message back (mobile originated message) to the application. It is common for computer applications to generate multiple messages to any given recipient in which case it is important for proper operation of the computer application to be able to uniquely relate any given response (mobile originated message) from the recipient to a given application-generated message (mobile terminated message). Unfortunately, the order in which the recipient replies to messages, and the order in which the wireless carrier network delivers the replies back to the application can be random, and there is no information present in the SMS message returned to the application which identifies which mobile terminated message the response was associated with.

Accordingly, it is desirable to have a system and method in which computer application-generated mobile terminated messages can have uniquely associated mobile originated responses.

SUMMARY OF THE INVENTION

The present invention overcomes the foregoing problems by providing a method in which a Mobile Terminated SMS (Short Message Service) wireless message generated by a Computer Application containing an embedded response menu can be sent to a Mobile Handset, and in which a Mobile Originated response from the Mobile Handset can be uniquely re-associated with the original Mobile Terminated SMS.

Given that SMS provides no inherent association between Mobile Terminated and Mobile Originated messages, the method and system in the present invention provide a scheme in which the original Computer Application menu response options are remapped to unique values prior to delivery to the Mobile Handset. When the response is received from the Mobile Handset, the method can uniquely re-associate and reverse map the response code back to the original Mobile Terminated message and original menu response options and present these to the Computer Application in a transparent fashion, that is the Computer Application needs no knowledge of the remapping that has occurred in the message delivered to the Mobile Handset or the reverse mapping on response return.

The method includes operation in a wireless environment in which SMS messages can be delivered out of order, can be delivered after considerable time delay, or can fail to be delivered altogether. Additionally, the Mobile Handset user can choose to respond to messages out of order, to respond with incorrect responses or to not respond at all. This method provides the Computer Application with a very simple method for sending messages with menu options and for receiving unambiguous responses back which identify which menu option was selected and to which message the response corresponds.

Broadly stated, a mobile content delivery system comprises: (a) a computer application generating a 1.7 way original message having a recipient number, a sender number, a message text, and menu options including associated response codes; (b) a delivery manager, coupled to the computer application, receiving the 1.7 way message from the computer application and calculating a set of remapped response codes that are uniquely associated with the recipient number-sender number pair; (c) a response lookup database coupled to the delivery manager, the delivery manager generating an entry in the response lookup database, the entry having a message identifier, a time stamp of when the message was received, the recipient number, the sender number, a message query, a set of response codes, and a set of remapped response codes; (d) a delivery manager which modifies the original message by replacing the set of response codes with the set of remapped codes to generate a modified message; and (e) a short message service center (SMSC) manager, coupled to the delivery manager, wherein the delivery manager sends the modified message to the SMSC manager, and the delivery manager returns the identified message to the computer application.

Advantageously, the present invention provides a method and system for various applications to uniquely re-associate each Mobile Originated response with an original Mobile Terminated SMS sent between devices.

The structures and methods of the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The invention will be described with respect to specific embodiments thereof, and reference will be made to the drawings, in which:

FIG. 6 is a flow chart illustrating a message cleanup process in accordance with the present invention.

DETAILED DESCRIPTION

Figure 1:
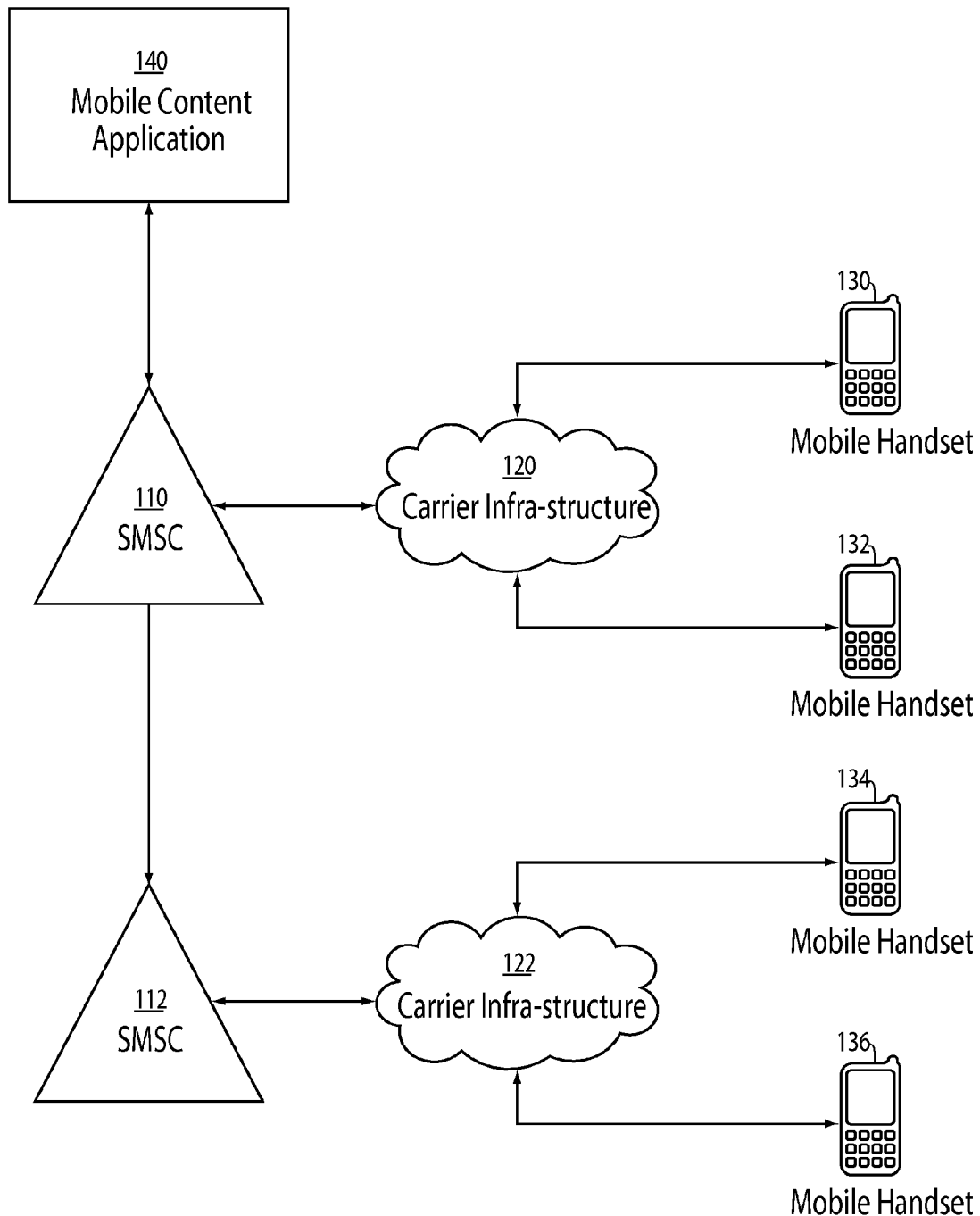
FIG. 1 is a system diagram for communicating between a mobile content application and mobile handsets in accordance with the present invention.

A description of structural embodiments and methods of the present invention is provided with reference to FIGS. 1-6. It is to be understood that there is no intention to limit the invention to the specifically disclosed embodiments but that the invention may be practiced using other features, elements, methods and embodiments. Like elements in various embodiments are commonly referred to with like reference numerals.

The following definitions may apply to some of the elements described with regard to some embodiments of the invention. These terms may likewise be expanded upon herein.

Short Message Service (SMS)—globally accepted wireless service that enables transmission of alphanumeric messages between mobile handsets and external systems such as electronic mail, paging, and voice-mail systems.

Mobile Content Application—computer application which generates SMS messages for delivery to and from mobile handsets.

Short Message Service Center (SMSC)—a combination of computer hardware and software operated by a wireless carrier which effectuates the delivery of SMS messages to and from SME's.

Mobile Handset—a wireless device capable of receiving and sending SMS messages, typically a cellular phone, or laptop computer with a cellular modem, a personal digital assistant (PDA), a handheld computer, a point of service (POS) terminal, etc.

Carrier Infra-Structure—a variety of computer software and hardware and telecommunications infra-structure that allows a wireless carrier to send and receive SMS messages.

Wireless Carrier—a company which is in the business of selling and servicing wireless communications including SMS messages.

Mobile Originated Short Message (MO-SM)—an SMS message generated by a mobile handset.

Mobile Terminated Short Messages (MT-SM)—an SMS message delivered to a mobile handset.

Short Messaging Entity (SME)—is a device that may receive or send SMS messages. The SME may be located in a fixed network, a mobile handset, or may be an SMSC.

Delivery Receipt—an indication provided by the SMSC to the Mobile Content Application that an SMS message has been delivered successfully to the mobile handset.

Mobile Station International ISDN Number (MSISDN)—the standard international telephone number used to identify a given subscriber based on the ITU-T (International Telecommunications Union-Telecommunication Standardization Sector) E.164 standard.

Short Code—a country or carrier specific number used to identify a Mobile Content Application as the sender or receiver of an SMS message. This code is presented as a telephone number to the mobile handset, but is guaranteed to not match the numbering plan of a MSISDN. These codes are referred to as short codes because they are typically 4, 5 or 6 digits in length and thus shorter than a MSISDN.

Big Text Number—a MSISDN used to identify a Mobile Content Application as the sender or receiver of an SMS message.

SMS Aggregator—a company whose business is the aggregation of SMS messages from multiple Mobile Content Applications and pass-through of these SMS messages to and from wireless carriers and possibly other down-stream SMS aggregators.

1-way Message—a message delivered in one direction only, e.g. from party A to party B, with no response sent from party B back to party A.

2-way Message—a message delivered in both directions, e.g. message is sent from party A to party B, and a response is sent from party B to party A.

1.5-way Message—a message delivered and a confirmation of receipt returned, e.g. party A sends a message to party B, and a confirmation that party B received the message is returned back to party A.

1.7 way Message—a message delivered and a menu response is returned, e.g. party A sends a message to party B along with a menu of possible responses, and party B sends a response with a selection from the menu.

Message Sender—the initiator of an SMS message.

Message Receiver—the recipient of an SMS message.

Sender Number—the number associated with a Message Sender. For a Mobile Handset, the associated MSISDN. For a Mobile Content Application, the associated Short Code or Big Text Number.

Receiver Number—the number associated with a Message Receiver. For a Mobile Handset, the associated MSISDN. For a Mobile Content Application, the associated Short Code or Big Text Number.

Response Code—for a 1.7 way message, a valid response value to the message.

Response Text—the text of an SMS message generated in response to a 1.7 way message.

Message Query—for a 1.7 way message, the part of the message which contains a query or question.

Message Menu—for a 1.7 way message, the part of the message which contains the valid response values.

Menu Options—for a 1.7 way message, the valid response values.

Remapped Response Code—a response code for a 1.7 way message which has been modified to be unique for a given recipient number/server number pair. For a given 1.7 way message, each response code is modified or remapped to a different response code on a unique one for one basis. For example, the response codes 1-ok, 2-reject might be remapped to 19-ok, 20-reject, in which case the response code 1 has a remapped response code of 19, and the response code 2 has a remapped response code of 20.

Message identifier—a identifier guaranteed to be unique for each 1.7 way message generated by a Mobile Content Application.

Database—storage that allows for saving and retrieving of structured data. The term "database" is construed broadly to encompass a wide variety of databases, and other similar or equivalent database functions including implementations in memory data structures, on disk data structures, and relational databases.

FIG. 1 illustrates a system diagram 100 of a Short Message Service (SMS) message flow between a mobile content application and mobile handset. SMS is implemented by Wireless Carriers to allow messages to be sent to and from Mobile Handsets 130, 132, 134, 136 and a Mobile Content Application 140. There are several paths SMS messages can flow: mobile to mobile communications, application to mobile communications, and mobile to application communications.

Mobile to mobile communications involve a message that is sent from one Mobile Handset to another. In this instance, the message travels from the Mobile Handset 130, through a Carrier Infra-Structure 120 to a SMSC 110, where the message is then routed to a SMSC 112, through a Carrier Infra-Structure 122 to the Mobile Handset 134. Alternately, a message can also travel from the Mobile Handset 130, through the Carrier Infra-Structure 120 to the first SMSC 110, and back again through the Carrier Infra-Structure 120 to the Mobile Handset 132. Application to mobile communications involve a message that is sent from the Mobile Content Application 140, to the SMSC 110, through the Carrier Infra-Structure 120 and finally to the Mobile Handset 130. Alternatively, a message can also travel from the Mobile Content Application 140, to the SMSC 110, then routed to SMSC 112, through the Carrier Infra-Structure 122 and finally to the Mobile Handset 134. Mobile to application communications involve a message that is sent from the Mobile Handset 130, through the Carrier Infra-Structure 120, to the SMSC 110, and finally to the Mobile Content Application 140. Alternatively, a message that is sent from the Mobile Handset 134, through the Carrier Infra-Structure 122, to the SMSC 112, then routed to SMSC 110, and finally to the Mobile Content Application 140.

The SMSCs 110, 112 described above can reside within a single Wireless Carrier environment, or can reside among multiple Wireless Carriers, where SMS messages can flow from one Wireless Carrier environment through to another Wireless Carrier environment through the SMSC to SMSC path. The connection between the Mobile Content Application 140 and the SMSC 110, 112 can be a direct link, or can flow through one or more third party SMS Aggregators.

To facilitate routing of SMS messages from between Mobile Handsets and other Mobile Handsets or Mobile Content Applications, an addressing scheme is employed. Every Mobile Handset has associated with it a unique phone number consistent with the MSISDN numbering scheme. Every Mobile Content Application has associated with it either a Short Code or a Big Text Number that uniquely identifies the Mobile Content Application within a given carrier or set of carriers with which the Mobile Content Application interacts. When an SMS message is transmitted from a Message Sender to a Message Receiver, the SMS message typically includes these features: Sender Number, Receiver Number and Message text.

For Mobile Content Applications, it is desirable to be able to send an SMS message to the Mobile Handset 130, and have the Mobile Handset (recipient) 130 return back a response to the Mobile Content Application 140. The following are just a few examples of where this is useful:

Voting application—the Mobile Content Application 140 sends out a question such as "Will you vote John Smith or Mary Jane? Reply 'john' or 'mary'" and collects the responses to this question to allow political analysis.

Help desk/support desk application—the Mobile Content Application 140 sends out a trouble ticket to a field service engineer such as "Ticket 456, call customer AAA Widdgets at 555-1212, reply with 1) escalate, 2) accept, 3) closed." The response to this message is used to determine whether to re-transmit the message to the field service manage (escalate), keep the ticket open (accept), or close the ticket (closed).

Information Technology (IT) alert application—the Mobile Content Application 140 sends out a message such as "System A440 disk is 95% full, reply with 1) run disk clean, 2) ignore". The response to this message is used to determine which action to take, either to run a clean disk operation, or to ignore the problem.

General Communication application—the Mobile Content Application 140 sends out a message such as "Lunch meeting changed from 12 pm to 12:30 pm room A12, reply with 1) will attend, 2) cannot attend".

Field Service Application—the Mobile Content Application 140 sends out a message such as "Repair required at 555 Rockville Ln, reply with 1) on site, 2) en route, 3) reject".

Alerts Applications—the Mobile Content Application 140 sends out alerts such as "Emergency, hazmat incident has occurred at corner of vine and almond st, 1) acknowledge, 2) ignore". Alerts can be used for a variety of purposes including government notices, corporate notices, emergency notices, general informational purposes, customer notifications, etc.

These types of interactions, as described in the above examples, are often referred to as 1.7 way messages. 1.7 way messages are composed of an initial message with two parts: (1) Message text, from the first example above, this would be "Will you vote for John Smith or Mary Jane?", (2) Menu of allowed responses, from the first example above, these would be 'john' or 'many'.

A response is then returned which corresponds to one of the menu options. The following describes the typical phases of a 1.7 way message interaction. The Mobile Content Application 140 generates a 1.7 way message composed of a) message text, b) menu options, c) sender number (the Mobile Content Application number), d) receiver number (the Mobile Handset number) and passes this message to the SMSC 110. The SMSC 110 passes the message to the Carrier Infra-Structure 120. The Carrier Infra-Structure 120 passes the message to the Mobile Handset 130. The recipient of the message then generates a response on the Mobile Handset 130 composed of a) message text matching an allowed menu option, b) sender number (the Mobile Handset number), c) recipient number (the Mobile Content Application number) and passes this message to the Carrier Infra-Structure 120. The Carrier Infra-Structure 120 passes the response to the SMSC 110. The SMSC 110 passes the response to the Mobile Content Application 140. The Mobile Content Application 140 then processes the response.

In the case where the Mobile Handset 130 responds to each 1.7 way message as they arrive, and unerroringly responds, the Mobile Content Application 140 can easily determine the correspondence between any given 1.7 way message and the associated response. But in the real world, any of the following can occur. Multiple 1.7way messages can be delivered to the Mobile Handset 130 before a response can be generated by the Mobile Handset 130. Responses from the Mobile Handset 130 can be delivered back to the Mobile Content Application 140 out of sequence, e.g. in an order that is different from original order the Mobile Content Application 140 sent them in. The recipient may choose or be unable to respond to a message altogether. The SMSC 110 or the Wireless Carrier may deliver 1.7 way messages to the Mobile Handset 130 in a different order than the Mobile Content Application 140 generates them. Messages and responses can be lost due to malfunctions or service interruptions in the SMSC 110, the Wireless Carrier or the Mobile Handset 130. Each 1.7 way message may have different or same message content and different or same menu options. The Mobile Content Application 140 might be aggregating messages for more than one up-stream application.

As a result, the Mobile Content Application 140 must be able to re-associate responses from the Mobile Handset 130 back to the correct corresponding 1.7way message regardless of the order in which the results arrive at the Mobile Content Application 140 and regardless of the message text or response menu options.

Figure 2:
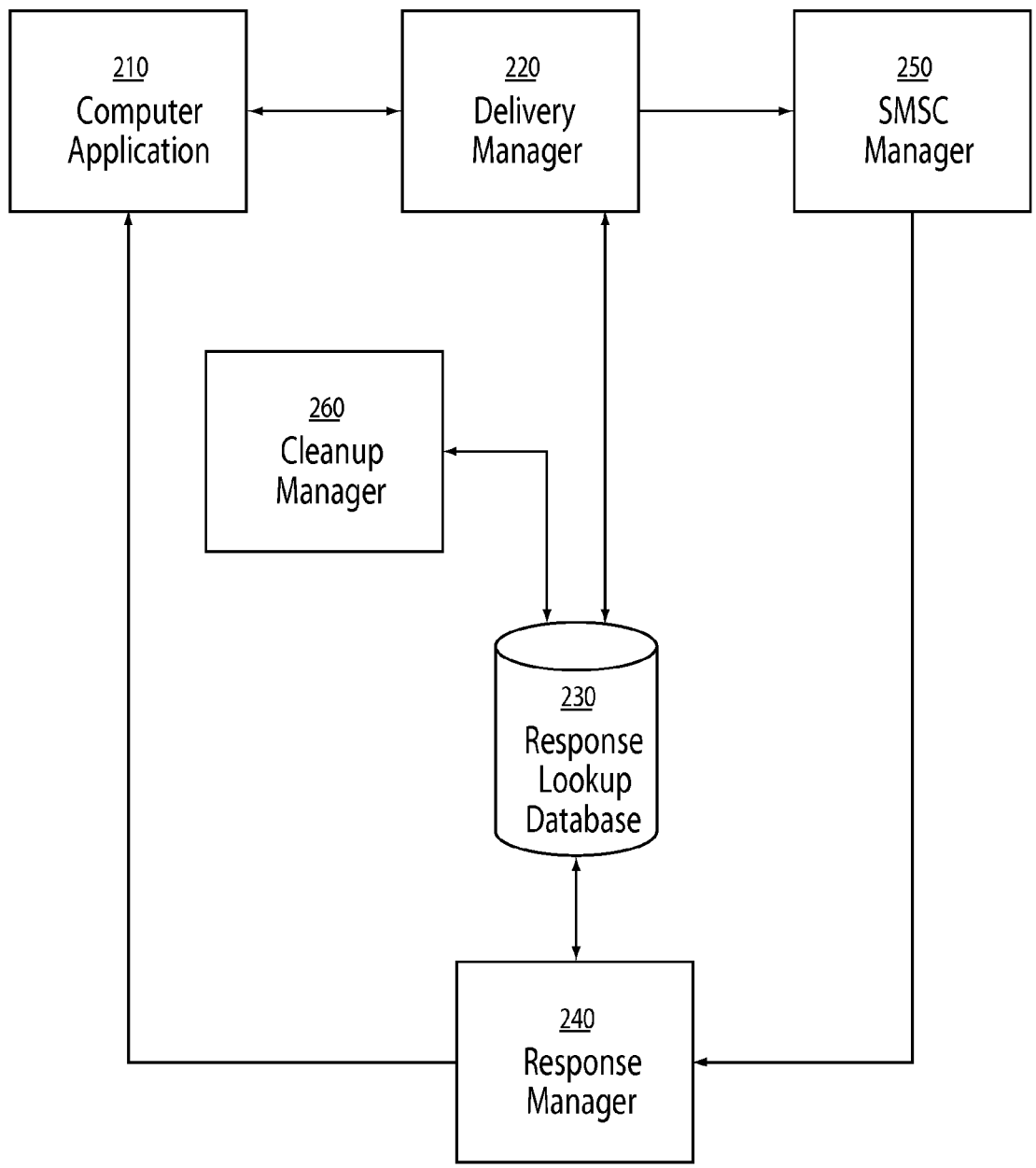
FIG. 2 is a system diagram of a mobile content application architecture in accordance with the present invention.

The design of the Mobile Content Application 140 which is capable of uniquely re-associating 1.7 way responses back to the correct associated 1.7 way message is one aspect of the invention. FIG. 2 illustrates a system diagram of the mobile content application architecture 140. A computer application 210 generates a 1.7way message with the following features: Recipient Number, Sender Number, Message text and Menu options and their associated Response Codes.

A Delivery Manager 220 accepts the 1.7 way message and performs the following five steps. In a first step, the Delivery Manager 220 calculates Remapped Response Codes that are unique for the given Recipient Number/Sender Number pair. In a second step, the Delivery Manager 220 creates a new entry in the Response Lookup Database 230 with the following information: Message Identifier, time message was received, Recipient Number, Sender Number, Message Query, Response Codes and Remapped Response Codes. In a third step, the Delivery Manager 220 modifies the original message, replacing Response Codes with the Remapped Response Codes. In a fourth step, the Delivery Manager 220 delivers the modified message to the SMSC Manager 250. In a fifth step, the Delivery Manager 220 returns the Message Identifier to the Computer Application 210.

The SMSC Manager 250 accepts a message from the Delivery Manager 220 and delivers the message to the Wireless Carrier via the SMSC 110, or possibly indirectly through an SMS Aggregator to the SMSC 110, which ultimately delivers the message to the Mobile Handset 130.

The SMSC Manager 250 accepts a response to a message from the Wireless Carrier via the SMSC 110, or possibly indirectly from an SMS Aggregator. The SMSC Manager 250 then delivers the response to the Response Manager 240. The response contains the following information: Mobile Content Application number, Mobile Handset number and Remapped Response Code including optionally additional response text.

The Response Manager 240 accepts the response from the SMSC Manager 250 and does the following. The Response Manager 240 performs a lookup in the Response Lookup Database 230 to find a match for: Recipient Number, which matches the response Mobile Handset number, Sender Number, which matches the response Mobile Content Application number, and Remapped Response Code. Next, if a match is found, then the Response Manager 240 calculates a Response Code from the Remapped Response Code and the following is returned to the Computer Application 210: Message Identifier and Response Code and optionally additional response text.

A Cleanup Manager 260 periodically removes entries from the Response Lookup Database 230 which have a receive time greater than a maximum allowed period. Remapped Response Codes can be re-used once they have been deleted for any given Recipient Number/Sender Number pair.

Several exemplary message scenarios are illustrated below. In this example, the Computer Application 210 generates a message as follows:

| Recipient Number | Sender Number | Message Text | Menu Options |
|---|---|---|---|
| 16505551212 | 81703 | Bldg 2 fire alarm | Ignore | call fire dept |

The Recipient Number is the MSISDN number of the Mobile Handset 130, the Sender Number is the Short Code of the Mobile Content Application 140, and the SMS message to be delivered has two parts, the message text 'Bldg 2 fire alarm' and a menu with two possible responses, 'ignore' (implicitly assigned Response Code of 1) and 'call fire dept' (implicitly assigned Response Code of 2). Response Codes in this embodiment are assigned numeric values starting at 1 for the first menu option, 2 for the second menu option, etc. Menu options are separated by the '|' character in this embodiment.

The message is passed from the Computer Application 210 to the Delivery Manager 220. The Delivery Manager 220 queries the Response Lookup Database 230 to determine which Remapped Response Codes are already in use for the given Recipient Number/Sender Number pair. For example, assuming the Response Lookup Database 230 contains these entries:

| Msg Id | Time | Recipient# | Sender# | MsgQuery | RespnseCode | RemappedCode |
|---|---|---|---|---|---|---|
| 3 | 14:05 | 16502221234 | 81703 | Host A is down | 1-accept<br>2-reject | 17-accept<br>18-reject |
| 16 | 17:03 | 16505551212 | 81703 | Host B disk 90% full | 1-reboot<br>2-ignore<br>3-escalate | 15-reboot<br>16-ignore<br>17-escalate |
| 17 | 19:02 | 16505551212 | 81703 | Host B temp is 85 | 1-shutdown<br>2-ignore | 18-shutdown<br>19-ignore |

The Delivery Manager 220 queries the Response Lookup Database 230 for all entries with Recipient Number/Sender Number pairs that match the message. In this case, message id 16 and 17 have matching entries of "16505551212" for the Recipient Number and "81703" for the Sender Number. From these matching entries, all of the currently in use Remapped Response Codes are extracted. In this instance, Remapped Response Codes 15, 16, 17, 18, and 19 are in use. The Delivery Manager 220 then allocates 2 new Remapped Response Codes (20 and 21) as follows:

| Response Code | Remapped Response Code |
|---|---|
| 1 | 20 |
| 2 | 21 |

In this embodiment, numeric Remapped Response Codes are used but any sort of Remapped Response Code could be used including arbitrary character sequences as long as the Remapped Response Codes are unique for a given Recipient/Sender pair.

Next, the Delivery Manager 220 inserts a new row in the Response Lookup Database as follows:

| Msg Id | Time | Recipient# | Sender# | MsgQuery | RespnseCode | RemapdCode |
|---|---|---|---|---|---|---|
| 18 | 21:23 | 16505551212 | 81703 | Bldg 2 fire alarm | 1-ignore<br>2-call fire dept | 20-ignore<br>21-call fire dept |

And returns the Message identifier 18 for the new message back to the Computer Application 210. Next the Delivery Manager 220 generates a new SMS message as follows:

| Recipient Number | Sender Number | Message |
|---|---|---|
| 16505551212 | 81703 | Bldg 2 fire alarm: 20-ignore, 21-call fire dept |

And forwards this message to the SMSC Manager 250 for delivery to the Wireless Carrier and the Mobile Handset 130.

When the Mobile Handset 130 generates a response to this message, the SMSC Manager 250 forwards the response to the Response Manager 240 which in this example receives the following:

| Handset Number | Application Number | Message |
|---|---|---|
| 16505551212 | 81703 | 21 optional extra text |

The Response Manager 240 then performs a query in the Response Lookup Database 230 for a matching entry with the same Recipient Number/Sender Number/Remapped Response Code values. In this case, the Message Identifier is 18. From this entry, the Response Manager 240 determines that the Response Code corresponding to the Remapped Response Code of 21 is 2. The Response Manager 240 then returns the following information to the Computer Application 210:

| Message Identifier | Response Code |
|---|---|
| 21 | 2 optional extra text |

The Computer Application 210 now can process the Response Code 2 which is associated with the message it originally generated (namely the 'call fire dept' menu option for message associated with Message Identifier 21). In addition, the Computer Application 210 can utilize the optional extra text associated with the response if desired.

The Cleanup Manager 260 periodically removes entries from the Response Lookup Database 230 which have a time value which is more than 30 minutes than the current time. This allows Remapped Response Codes to be re-used to provide for better human ergonics by keeping the Remapped Response Codes short and easily understood. The time interval that Response Lookup Database 230 entries are retained is application dependent and subject to the length of time during which message content remains valuable.

Figure 3:
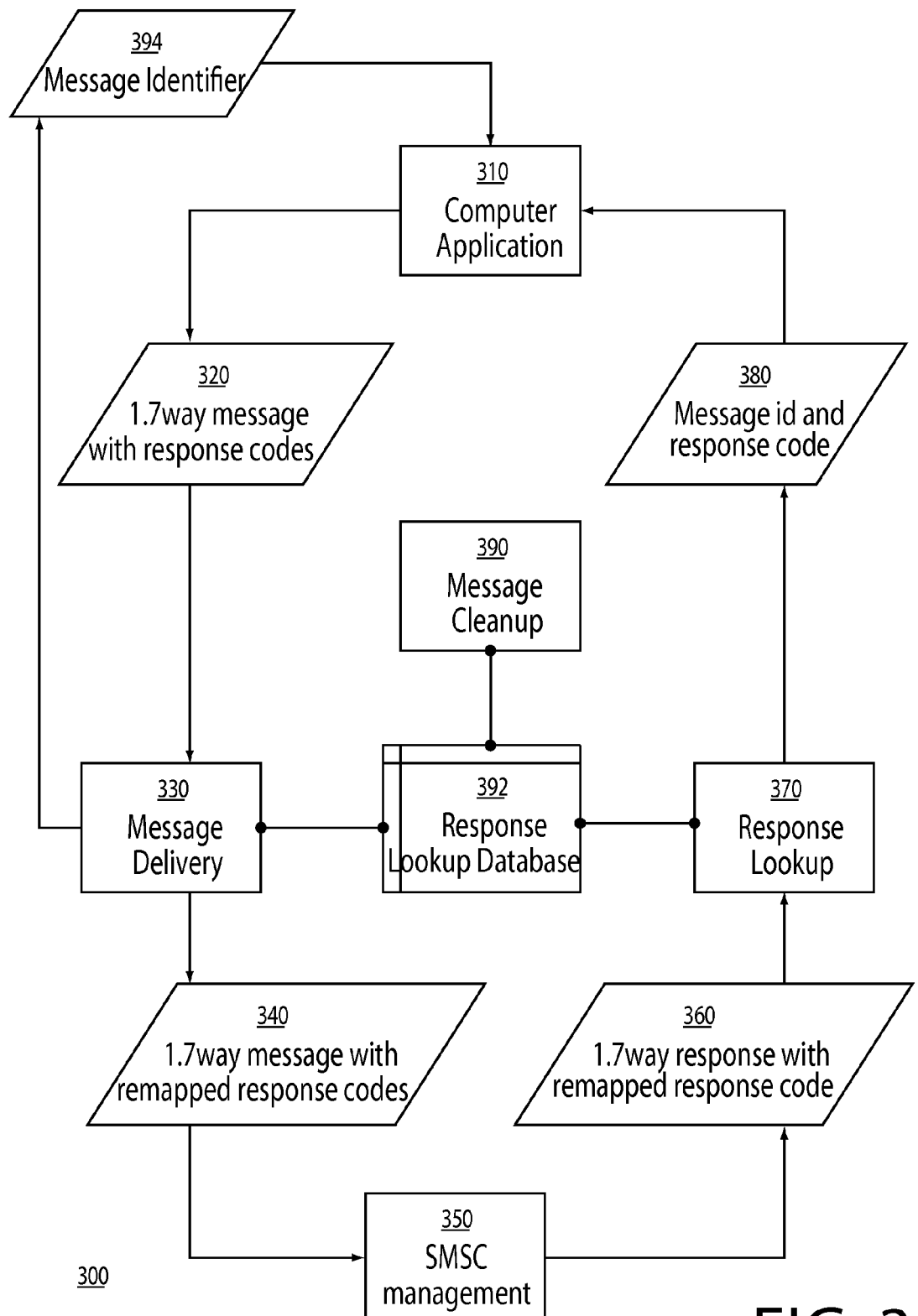
FIG. 3 is a simplified flow chart illustrating an overall message flow in 1.7 way messages in accordance with the present invention.

FIG. 3 illustrates a simplified flow chart of an overall message flow 300 in 1.7 way messages. 1.7 way Messages 320 are initiated by a Computer Application 310 and passed to a Message Delivery 330. The Message Delivery 330 generates a Message Identifier 394 and passes the Message Identifier 394 back to the Computer Application 310. The Message Delivery 330 calculates Remapped Response Codes and stores the Remapped Response Codes along with other message information in a Response Lookup Database 392. The Message Delivery 330 generates a new message with Response Codes replaced by Remapped Response Codes and passes this 1.7 way message 340 to the SMSC Management 350. The SMSC Management 350 delivers the 1.7 way message to the Mobile Handset 130. The SMSC Management 350 passes incoming 1.7 way responses 360 to a Response Lookup 370. The Response Lookup 370 queries the Response Lookup Database 392 to determine the Message Identifier for each 1.7way response (Remapped Response Code) that arrives and passes the Message Identifier and Response Code 380 to the Computer Application. The Message Cleanup 390 periodically removes entries from the Response Lookup Database 392 that exceed a maximum allowed lifetime for Remapped Response Codes.

Various code used through a message delivery flow, as described below with respect to FIG. 1, assumes a database schema for the Results Lookup Database as follows (SQL language per the mySQL implementation):

```
CREATE TABLE rmap (
    rmap_index BIGINT UNSIGNED NOT NULL
    AUTO_INCREMENT PRIMARY KEY,
    rmap_ts INT UNSIGNED,
    rmap_sender VARCHAR(64),
    rmap_recipient VARCHAR(64),
    rmap_minmap INT,
    rmap_maxmap INT,
    rmap_options VARCHAR(160)
);
```

Figure 4:
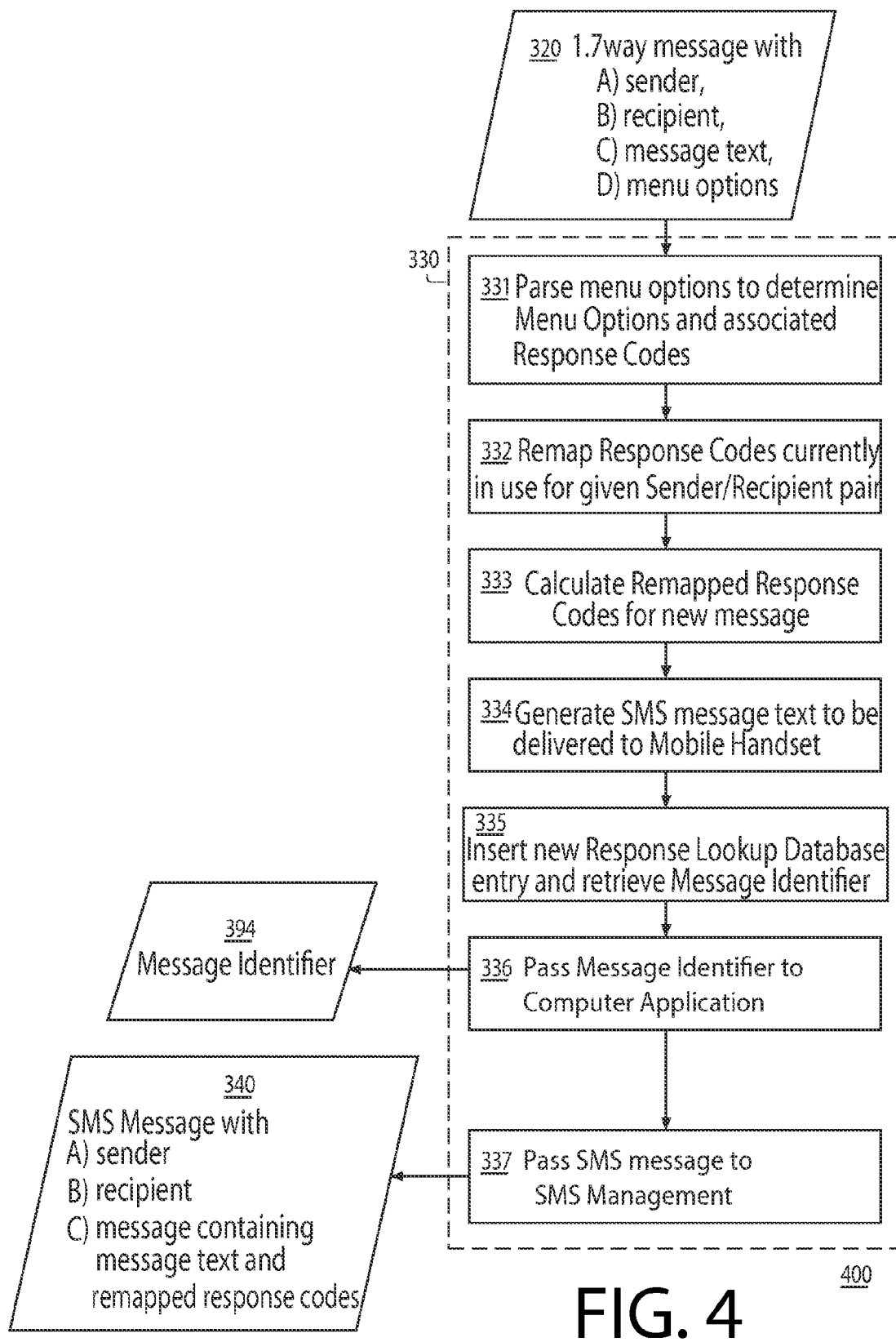
FIG. 4 is a simplified flow chart illustrating message delivery flow in accordance with the present invention.

FIG. 4 illustrates a flow chart of a message delivery flow 400. The 1.7 way Message 320 arrives with the following values: (a) Sender, (b) Recipient, (c) Message Text and (d) Menu Options.

As an optional step at step 331, the 1.7 way Message 320 menu options are parsed to extract the response codes. Menu Options in this embodiment are encoded within a single text string with the '|' separating menu options, and there being an implicit ordering of menu options to Response Codes starting with the first menu option being Response Code 1, the second being 2, etc. (All coding examples are in the Perl language, possibly with embedded SQL calls per the mySQL implementation):

my @options=split /\|/,$msg_options;

At step 332, the Response Lookup Database 392 is queried to determine Remapped Response Codes currently in use for the given Sender/Recipient pair. In this embodiment, the Response Lookup Database 392 is queried to determine the minimum ($minmap below) and maximum ($maxmap below) Remapped Response Codes currently in use for the given Sender/Recipient pair as follows:

```
$minmap = &dbquery("SELECT MIN(rmap_minmap) FROM rmap
    WHERE rmap_sender=$sender AND rmap_recipient=$recipient");
$minmap = 0 if ! defined $minmap;
$maxmap = &dbquery("SELECT MAX(rmap_maxmap) FROM ramp
    WHERE rmap_sender=$sender AND rmap_recipient=$recipient");
$maxmap = 0 if ! defined $maxmap;
```

At step 333, Remapped Response Codes are calculated to avoid overlap with currently in use Remapped Response Codes. In this embodiment, Remapped Response Codes ($minmap to $maxmap below) are calculated as follows:

```
# re-use lower map values again if possible
$mapstart = $minmap - (#@options + 1);
# allocate upper map values if necessary
if ($mapstart <= 0) {
    $mapstart = $maxmap + 1;
}
$minmap = $mapstart;
$maxmap = $mapstart + $#options;
```

At step 334: The final SMS message text is calculated. In this embodiment, the final SMS message text is calculated by appending the calculated menu to the message text as follows:

```
$index = $mapstart;
$postfix = "";
foreach my $opt (@options) {
    $postfix = ",$opt=$index";
    $index++;
}
```

```
$ts = time();
&dbquery("INSERT INTO rmap VALUES(NULL,$ts,$sender,$recipient,$minmap,$maxmap,$msg_options)");
$msg_identifier = &dbquery("SELECT LAST_INSERT_ID()");
```

```
$newmsg = $msg_text . $postfix;
```

At step 335, a new entry is inserted in the Response Lookup Database and the Message Identifier is calculated. In this embodiment the Message Identifier ($msg_identifier below) is retrieved after the insert is complete as follows:

At step 336: The Message Identifier ($msg_identifier from above) is passed to the Computer Application. At step 337, the SMS message text ($newmsg above) is passed along with the Sender Number and Recipient Number to the SMS Management.

Figure 5:
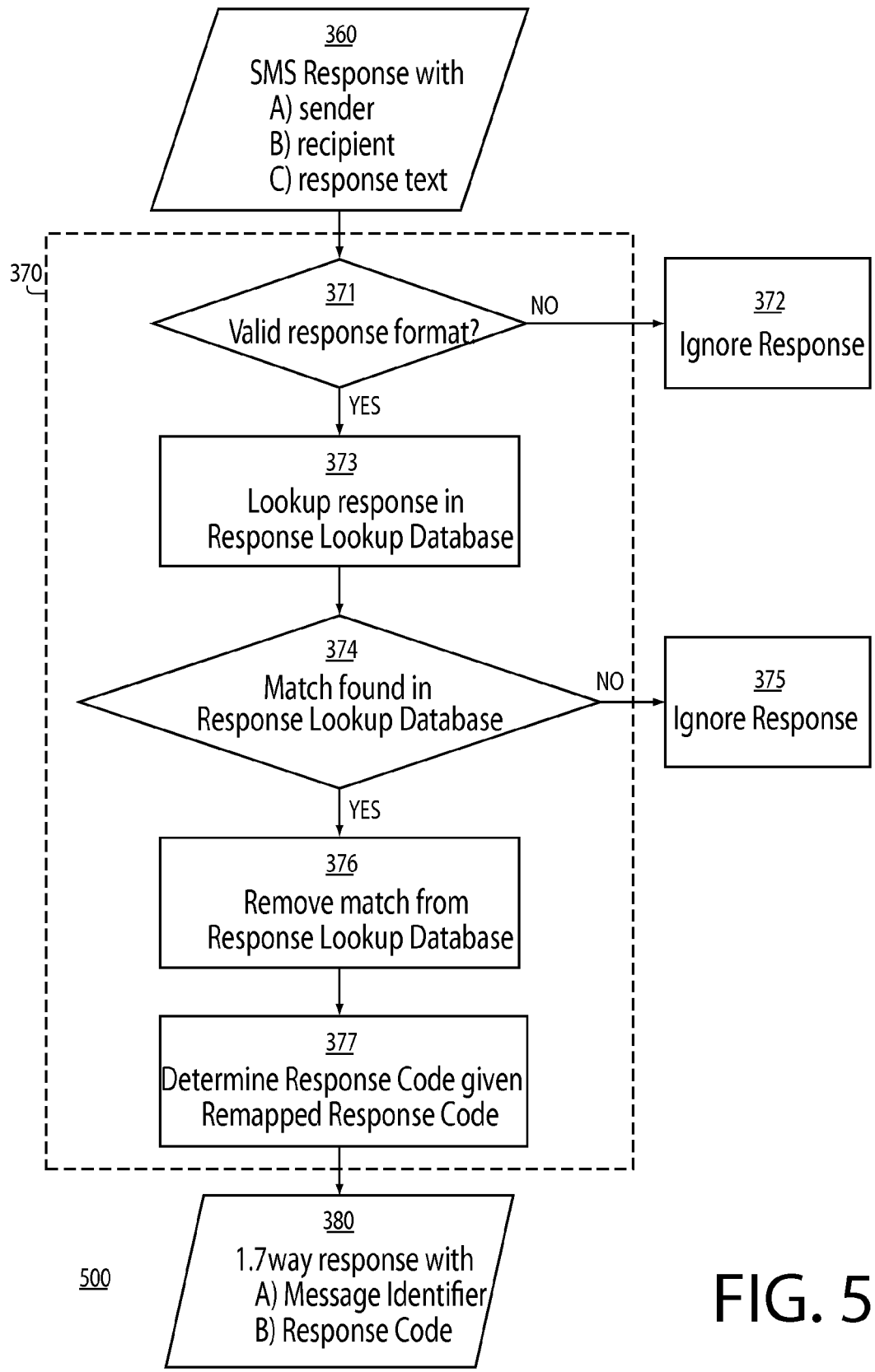
FIG. 5 is a flow chart illustrating a response lookup process in accordance with the present invention.

FIG. 5 illustrates a flow chart in a response lookup flow 500. The 1.7way Response 360 arrives with the following values: (a) Sender, (b) Recipient, and (c) Response Text. At step 371, The Response Text is checked for basic format conformance as follows:

```
# must have valid leading digit response
if(!($response =~ /^[0-9]+/)) {
    # reject response....
}
else {
    $fullresponse = $response;
    $response =~ s/^([0-9]+).*$/$1/;
    # process response...
}
```

If the response format test fails, the response is rejected at step 372. At step 373, the Response Lookup Database is searched for a matching entry to the given Remapped Response Code, Sender and Recipient. Note that the sense of Sender and Recipient are reversed to reflect the fact that the Sender of the response must match the Recipient of the outgoing 1.7 way message, and the Recipient of the response must match the Sender of the outgoing 1.7 way message when performing the entry match. The following shows an implementation for this lookup:

```
($rmap_index,$rmap_options,$rmap_minmap,$rmap_maxmap) =
    &dbquery(""SELECT rmap_index,rmap_options,rmap_minmap,rmap_maxmap FROM rmap WHERE
    rmap_sender=$recipient AND rmap_recipient=$sender AND rmap_minmap <= $response AND $response <=
    rmap_maxmap");
```

At step 374, if the lookup for matching Remapped Response Code fails, the response is rejected at step 375, as illustrated in an exemplary implementation below:

```
if (! defined $rmap_index) {
    # reject response...
}
else {
    # continue processing response...
```

-continued

```
}
```

At step 376, the matched entry in the Lookup Response Database 392 is removed to avoid a duplicate response match should another identical match arrive, and also to free up the Remapped Response Code's to be re-used per the following:
&dbquery("DELETE FROM rmap WHERE rmap_index=$map_index");

At step 377, the Response Code is calculated from the Remapped Response Code (the response received) per the following:

```
my @options = split /\|/,$rmap_options;
my $unmapped = $options[$response - $rmap_minmap];
```

At step 360, the Message Identifier and Response Code are now available for return to the Computer Application as the $rmap_index and $unmapped variable values. Optionally the full response text ($fullresponse) including optional response text is returned to the Computer Application.

FIG. 6 illustrates a message cleanup flow 690 where entries in the Response Lookup Database 392 are cleaned on a regular basis as follows: Delete all entries from the Response Lookup Database 392 in the Message Clean up 690 which are older than KEEPTIME seconds as shown in the following implementation:

```
$scrubtime = time( ) – $KEEPTIME;
&dbquery("DELETE FROM rmap WHERE rmap_ts < $scrubtime");
```

KEEPTIME is set to a value large enough to insure that Remapped Response Codes continue to be available in the Response Lookup Database for all incoming responses (typically the lifetime of the value of messages being sent), but short enough such that Remapped Response Codes do not get unwieldy in terms of human ergonomics.

An ordinary artisan should require no additional explanation in developing the methods and systems described herein but may nevertheless find some possibly helpful guidance in the preparation of these methods and systems by examining standard reference works in the relevant art.

These and other changes can be made to the invention in light of the above detailed description. In general, in the following claims, the terms used should not be construed to limit the invention to the specific embodiments disclosed in the specification and the claims, but should be construed to include all methods and systems that operate under the claims set forth herein below. Accordingly, the invention is not limited by the disclosure, but instead its scope is to be determined entirely by the following claims.

I claim:

1. A mobile content system for sending and receiving a short message service (SMS) message, comprising:
    a computer application generating an originated SMS message by a computer having a recipient number, a sender number, a message text, and menu options associated with a plurality of response codes, the recipient number and the sender number forming a recipient number-sender number pair;
    a delivery manager, coupled to the computer application, receiving the originated SMS message from the computer application and computing a plurality of remapped response codes by a computer that are uniquely associated with the recipient number-sender number pair;
    a response lookup database, coupled to the delivery manager, the delivery manager generating an entry by a computer in the response lookup database, the entry having a message identifier, a time stamp of when the message was received, the recipient number, the sender number, a message query, the plurality of response codes, and the plurality of remapped response codes, the delivery manager generating a modified SMS message by replacing the plurality of response codes with the plurality of remapped response codes;
    a short message service center manager, coupled to the delivery manager, the delivery manager sending the modified SMS message to the short message service center manager, the short message service center manager sending the modified SMS message to a mobile handset; and
    a response manager, coupled to the short message service center manager and the response lookup database, for performing a lookup in the response lookup database by a computer to determine whether there is an entry in the response lookup database that matches with the recipient number, the sender number and a remapped response code in the plurality of remapped response codes generated from the originated SMS message, wherein if there is a match, the response manager computes a response code that corresponds to the remapped response code, and returning the message identifier and the response code to the computer application.

2. The mobile content system of claim 1, wherein the originated SMS message comprises a 1.7 way SMS message.

3. The mobile content system of claim 1, wherein the delivery manager queries the response lookup database to determine remapped response codes that are currently in use before computing the plurality of remapped response codes.

4. The mobile content system of claim 1, wherein the short message service center manager accepts the modified SMS message from the delivery manager and sends the modified SMS message to the mobile handset.

5. The mobile content system of claim 1, further comprising a cleanup manager, coupled to the response lookup database, for deleting entries in the response lookup database that are no longer needed.

6. The mobile content system of claim 5, wherein the response lookup database retains the entry for sufficient time to ensure that the plurality of the remapped response codes continue to be available.

7. The mobile content system of claim 1, wherein the text of the originated SMS message comprises a voting application.

8. The mobile content system of claim 1, wherein the text of the originated SMS message comprises a help desk or support desk application.

9. The mobile content system of claim 1, wherein the text of the originated SMS message comprises an information technology alert application.

10. The mobile content system of claim 1, wherein the text of the originated SMS message comprises a general communication application.

11. The mobile content system of claim 1, wherein the text of the originated SMS message comprises a field service application.

12. The mobile content system of claim 1, wherein the text of the originated SMS message comprises an alert application.

13. The mobile content system of claim 1, wherein the short message service center manager sending the modified SMS message to the mobile handset via a wireless carrier and an short message service center.

14. The mobile content system of claim 1, wherein the short message service center manager sending the modified SMS to the mobile handset via an short message service aggregator and an short message service center.

15. A mobile content system for communicating a short message service (SMS) message, comprising:
a computer application generating an originated SMS message by a computer having a recipient number, a sender number, a message text, and menu options associated with a plurality of response codes, the recipient number and the sender number forming a recipient number-sender number pair;
a delivery manager, coupled to the computer application, receiving the originated SMS message from the computer application and computing a plurality of remapped response codes by a computer that are uniquely associated with the recipient number-sender number pair;
a response lookup database, coupled to the delivery manager, the delivery manager generating an entry by a computer in the response lookup database, the entry having a message identifier, a time stamp of when the message was received, the recipient number, the sender number, a message query, the plurality of response codes, and the plurality of remapped response codes, the delivery manager generating a modified SMS message by replacing the plurality of response codes with the plurality of remapped response codes;
a short message service center manager, coupled to the delivery manager, the delivery manager sending the modified SMS message to the short message service center manager, the short message service center manager sending the modified SMS message to a mobile handset; and
a response manager, coupled to the short message service center manager and the response lookup database, for performing a lookup in the response lookup database by a computer to determine whether there is an entry in the response lookup database that matches with the recipient number, the sender number and a remapped response code in the plurality of remapped response codes generated from the original SMS message, wherein if there is a match, the response manager computes a response code that corresponds to the remapped response code, and returning the message identifier and the response code and additional response text to the computer application.

16. The mobile content system of claim 15, wherein the originated SMS message comprises a 1.7way SMS message.

17. The mobile content system of claim 15, wherein the delivery manager queries the response lookup database to determine remapped response codes that are currently in use before computing the plurality of remapped response codes.

18. The mobile content system of claim 15, wherein the short message service center manager accepts the modified SMS message from the delivery manager and sends the modified SMS message to the mobile handset.

19. The mobile content system of claim 15, further comprising a cleanup manager, coupled to the response lookup database, for deleting entries in the response lookup database that are no longer needed.

20. The mobile content system of claim 19, wherein the response lookup database retains the entry for sufficient time to ensure that the plurality of the remapped response codes continue to be available.

21. The mobile content system of claim 15, wherein the text of the originated SMS message comprises a voting application.

22. The mobile content system of claim 15, wherein the text of the originated SMS message comprises a help desk or support desk application.

23. The mobile content system of claim 15, wherein the text of the originated SMS message comprises an information technology alert application.

24. The mobile content system of claim 15, wherein the text of the originated SMS message comprises a general communication application.

25. The mobile content system of claim 15, wherein the text of the originated SMS message comprises a field service application.

26. The mobile content system of claim 15, wherein the text of the originated SMS message comprises an alert application.

27. The mobile content system of claim 15, wherein the short message service center manager sending the modified SMS message to the mobile handset via a wireless carrier and an short message service center.

28. The mobile content system of claim 15, wherein the short message service center manager sending the modified SMS to the mobile handset via an short message service aggregator and an short message service center.

* * * * *